(12) United States Patent
Ramasamy et al.

(10) Patent No.: US 11,628,701 B2
(45) Date of Patent: Apr. 18, 2023

(54) LEAF SPRING BRACKET

(71) Applicant: Volvo Truck Corporation, Gothenburg (SE)

(72) Inventors: Venkatachalam Ramasamy, Karnataka (IN); Ramachandran Sandrasekaran, Karnataka (IN)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 17/516,815

(22) Filed: Nov. 2, 2021

(65) Prior Publication Data

US 2022/0176763 A1 Jun. 9, 2022

(30) Foreign Application Priority Data

Dec. 4, 2020 (EP) .................................... 20211871

(51) Int. Cl.
| | | |
|---|---|---|
| *B60G 11/107* | (2006.01) | |
| *B60G 11/04* | (2006.01) | |
| *F16F 1/26* | (2006.01) | |

(52) U.S. Cl.
CPC ............ *B60G 11/107* (2013.01); *B60G 11/04* (2013.01); *B60G 2202/112* (2013.01);
(Continued)

(58) Field of Classification Search
CPC . B60G 11/04; B60G 11/107; B60G 2202/112; B60G 2204/121; B60G 2206/428; B60G 2800/162; F16F 1/26
See application file for complete search history.

(56) References Cited

U.S. PATENT DOCUMENTS

| 5,850,069 A | 12/1998 | Betts | |
|---|---|---|---|
| 6,206,407 B1 | 3/2001 | Fuchs et al. | |
| 2013/0069333 A1* | 3/2013 | Pizzeta | B60G 11/04 280/124.116 |

FOREIGN PATENT DOCUMENTS

| JP | S61169308 A | 7/1986 |
|---|---|---|
| JP | 09156336 A * | 6/1997 |

(Continued)

OTHER PUBLICATIONS

Description Translation for KR 101426699 from Espacenet (Year: 2014).*

(Continued)

*Primary Examiner* — James A English
*Assistant Examiner* — Daniel M. Keck
(74) *Attorney, Agent, or Firm* — Withrow & Terranova, PLLC

(57) ABSTRACT

The invention relates to a first leaf spring bracket having a longitudinal axis and a transverse axis which is configured to be secured to a vehicle frame and which receives a rear end portion of a leaf spring so as to allow the leaf spring rear end portion to slide longitudinally relative to the first leaf spring bracket, characterized in that the first leaf spring bracket comprises an insert comprising an insert pad extending transversally and two perpendicular arms, the insert comprising a bottom surface and a top surface and being made of austempered ductile iron, and a bracket comprising a bracket pad extending transversally and two perpendicular arms, the bracket comprising a bottom surface and a top surface, the bottom surface of the bracket pad being configured to receive the top surface of the insert, the bracket being made of spheroidal graphite cast iron.

11 Claims, 2 Drawing Sheets

(52) U.S. Cl.
CPC .. *B60G 2204/121* (2013.01); *B60G 2206/428* (2013.01); *B60G 2800/162* (2013.01)

(56) References Cited

FOREIGN PATENT DOCUMENTS

| | | | |
|---|---|---|---|
| JP | H1134912 A1 | * | 2/1999 |
| JP | 2001219726 A | * | 8/2001 |
| KR | 101426699 B1 | | 8/2014 |
| WO | 2018211299 A1 | | 11/2018 |

OTHER PUBLICATIONS

Description Translation for WO 2018211299 from Espacenet (Year: 2018).*

European Search Report for European Patent Application No. 20211871.7, completed May 18, 2021, 3 pages.

* cited by examiner

LEAF SPRING BRACKET

RELATED APPLICATION

The present application claims priority to European Patent Application No. 20211871.7, filed on Dec. 4, 2020, and entitled "LEAF SPRING BRACKET," which is incorporated herein by reference in its entirety.

TECHNICAL FIELD

The invention relates to a first leaf spring bracket, a suspension system of a vehicle axle, a vehicle comprising said suspension system and a method for the manufacture of the first leaf spring bracket.

The invention can be applied in heavy-duty vehicles, such as trucks, buses and construction equipment, but is not restricted to these vehicles.

BACKGROUND

A conventional suspension for a vehicle includes a leaf spring, made of one leaf or several superimposed leaves, which is arranged longitudinally adjacent and under a frame girder of the vehicle.

There are provided a front leaf spring bracket and a rear leaf spring bracket, both secured to the vehicle frame. The leaf spring front-end portion is engaged in the front leaf spring bracket, generally with no degree of freedom along the longitudinal direction, while the leaf spring rear end portion is engaged in the rear leaf spring bracket to be able to slide longitudinally relative to the first leaf spring bracket. Furthermore, the leaf spring comprises an intermediate portion engaged in an intermediate attachment device for attaching the vehicle axle to the vehicle frame.

Generally, the suspension is only made of Austempered Ductile Iron (ADI). Indeed, due to the sliding principle, high wear resistance material like ADI is needed for the suspension. However, the production cost of the suspension made of ADI is high and the suspension is heavy.

There is a need to minimize the production cost of the suspension and to reduce the weight of the bracket suspension without compromising its mechanical properties.

SUMMARY

An object of the invention is to provide a cost saving suspension system, in particular a leaf spring bracket, having a reduced weight while maintaining the mechanical properties.

To that end, according to a first aspect, the invention concerns a first leaf spring bracket having a longitudinal axis and a transverse axis which is configured to be secured to a vehicle frame and which receives a rear end portion of a leaf spring so as to allow said leaf spring rear end portion to slide longitudinally relative to the first leaf spring bracket, said first leaf spring bracket comprising:
  an insert comprising an insert pad extending transversally and two perpendicular arms, said insert comprising a bottom surface and a top surface and being made of austempered ductile iron,
  a bracket comprising a bracket pad extending transversally and two perpendicular arms, said bracket comprising a bottom surface and a top surface, the bottom surface of the bracket pad being configured to receive the top surface of the insert, the bracket being made of spheroidal graphite cast iron (SGCI).

ADI is only used for the manufacture of a specific region where the first leaf spring bracket receives a rear end portion of a leaf spring and SGCI is used for the rest of the first leaf spring bracket. Thus, the first leaf spring bracket according to the present invention has a reduced weight and is cost saving. Additionally, the mechanical properties of the first leaf spring bracket are maintained.

The invention is particularly favorable for a suspension system which comprises said first leaf spring bracket.

In one embodiment, the insert pad has a concave or convex shape. In a preferred embodiment, the insert pad has a convex shape.

In one embodiment, the bracket pad has a concave or convex shape. In a preferred embodiment, the bracket pad has a convex shape.

In one embodiment, the insert pad comprises a protrusion located on its top surface and the bottom surface of bracket comprises a groove able to receive said protrusion. This embodiment allows for an improved fixation of the insert pad and the bottom surface of bracket.

In one embodiment, the bracket further comprises two lateral arms extending longitudinally.

In one embodiment, the bracket further comprises a central arm that overhangs the bracket pad and the insert pad.

In one embodiment, the at least one element chosen from among: the central arm of the bracket and the two the two lateral arms of the bracket, comprises at least one hole. In this embodiment, the holes are configured to receive for example a screw in order to set the first leaf spring bracket to a girder frame.

In one embodiment, the perpendicular arms of the insert and the two perpendicular arms of the bracket comprise at least one hole. In this embodiment, holes are configured to receive a fastener.

According to a second aspect, the invention concerns a suspension system of a vehicle axle comprising:
  a leaf spring having a longitudinal axis and a transverse axis and comprising a rear end portion, preferably loop-shaped,
  a first leaf spring bracket according to the present invention, the first leaf spring bracket being configured to be secured to a vehicle frame and which receives a rear end portion of a leaf spring so as to allow said leaf spring rear end portion to slide longitudinally relative to the first leaf spring bracket, and
  a fastener extending substantially transversally, the bracket and insert pads being located above the fastener.

The suspension system of a vehicle axle according to the present invention has a reduced weight and is cost saving thanks to the first leaf spring bracket.

In one embodiment, the leaf spring comprises a rear end portion substantially flat and has a top surface in contact with the first leaf spring bracket and insert pads and a bottom surface.

In one embodiment, the suspension system further comprises a second leaf spring bracket configured to be secured to the vehicle frame and an intermediate attachment device, the leaf spring comprising a front end portion, preferably loop-shaped, which is engaged in said second leaf spring bracket and an intermediate portion engaged in said intermediate attachment device for attaching the vehicle axle to the vehicle frame.

According to a third aspect, the invention concerns a vehicle comprising a frame, an axle and a suspension system according to the present invention.

According to a third aspect, the invention concerns a method for the manufacture of the first leaf spring bracket according to the present invention, said method comprising the following steps:
A. The provision of a bracket according to the present invention, said bracket being made of spheroidal graphite cast iron and
B. The manufacture of the insert according to the present invention onto the bracket, said insert being made of austempered ductile iron.

In one embodiment, in step B), the manufacture of the insert onto the bracket is performed by compound casting. Compound casting simplifies joining processes by directly casting the melted insert onto a solid bracket. A continuously metallurgic transition is very important for industrial applications, such as joint structures of suspension systems. By using the compound casting, the first leaf spring bracket is a hybrid construction from the combination of the two materials. ADI and SGI form a bonding via form closure and force closure.

In one embodiment, in step B), the manufacture of the insert onto the bracket is performed by thermal spraying. In this embodiment, the melted insert is sprayed onto the bracket. For example, the thermal spraying include: plasma spraying, detonation spraying, wire arc spraying, Flame spraying, High velocity oxy-fuel coating spraying (HVOF), High velocity air fuel (HVAF), Warm spraying, Cold spraying and Spray and Fuse.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
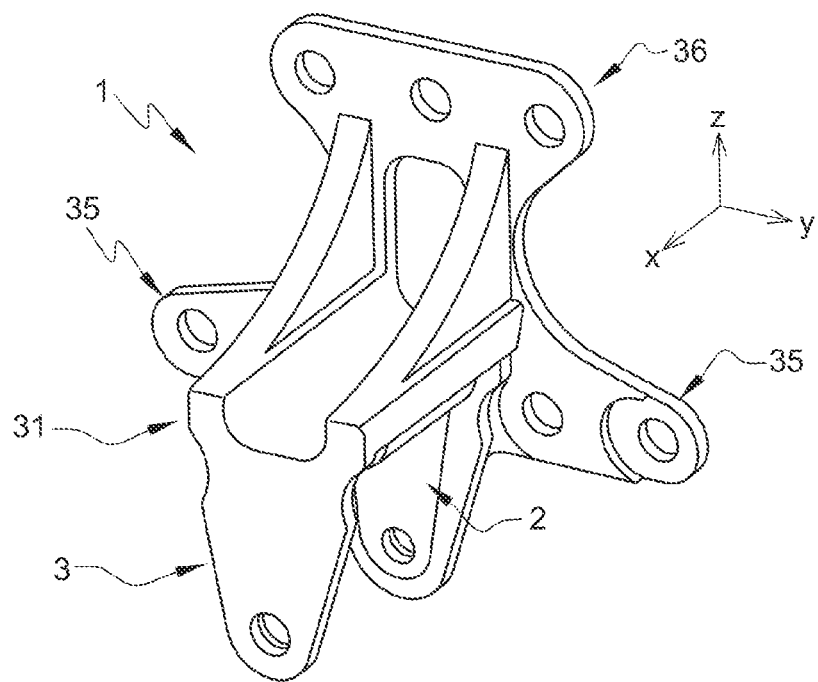
FIG. 1 is a perspective view of a first leaf spring bracket according to the present invention.

FIG. 1 illustrates a first leaf spring bracket 1 that can comprise an insert 2 and a bracket 3. The longitudinal direction X is defined as the longitudinal direction of first leaf spring bracket 1. The transverse direction Y is the direction of the first leaf spring bracket 1, and Z is the vertical direction.

Figure 2:
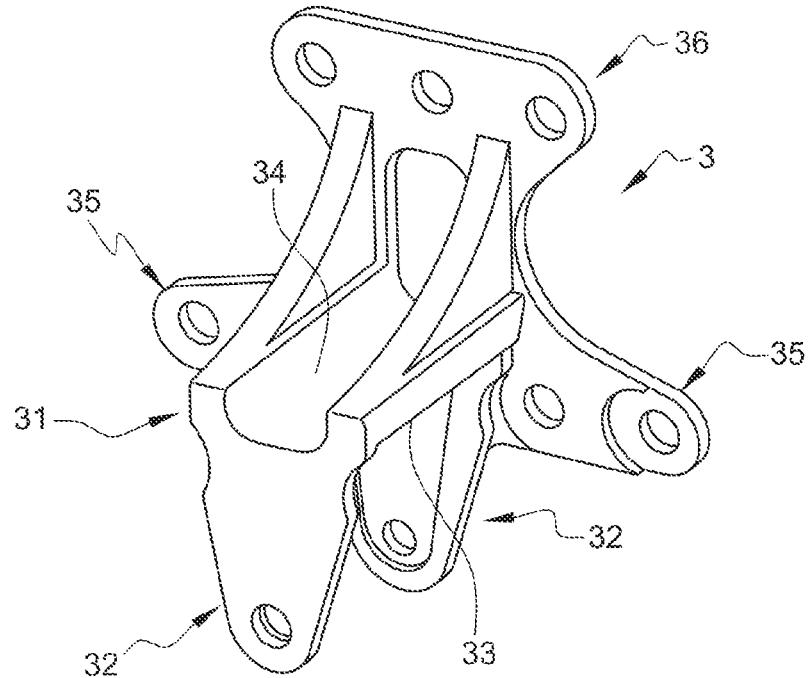
FIG. 2 is a perspective view of a bracket included in a first leaf spring bracket according to the present invention.

The bracket 3 can comprise a bracket pad 31 extending transversally and two perpendicular arms 32, said bracket 3 comprising a bottom surface 33 and a top surface 34. The bracket 3 is made of spheroidal graphite cast iron. The bracket 3 can further comprise two lateral arms 35 extending longitudinally and a central arm 36 that overhangs the bracket pad 33 and the insert pad 21 (FIG. 2).

Figure 3:
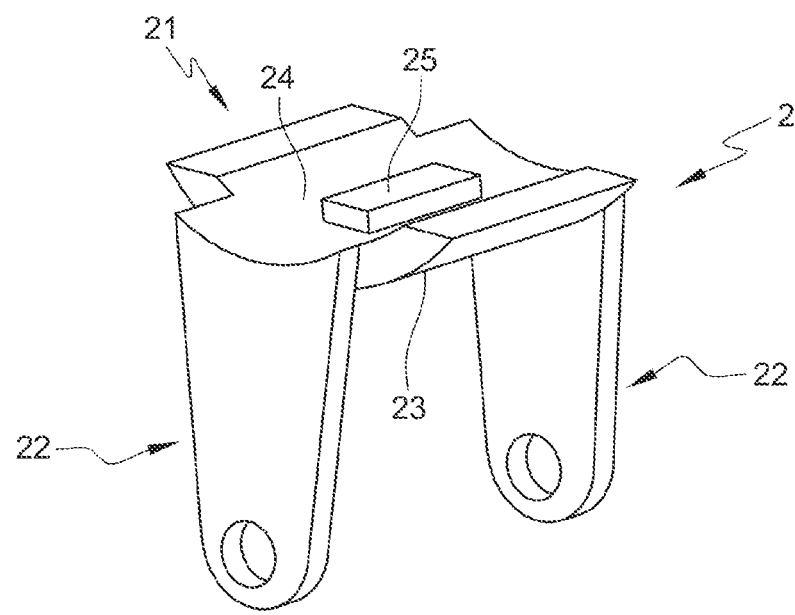
FIG. 3 is a perspective view of an insert included in a first leaf spring bracket according to the present invention and FIG. 4 is a suspension system comprising a first leaf spring bracket according to the present invention.

The insert 2 can comprise an insert pad 21 extending transversally and two perpendicular arms 22, said insert 2 comprising a bottom surface 23 and a top surface 24 and being made of austempered ductile iron (FIG. 3).

As shown in FIG. 1, the bottom surface 33 of the bracket pad 31 can be configured to receive the top surface 24 of the insert 2.

In the illustrated Examples, the insert pad 21 has a convex shape and the bracket pad 31 has a convex shape. The insert pad 2 comprises a protrusion located on its top surface and the bottom surface of bracket 33 comprises a groove (not illustrated) able to receive said protrusion 25.

For example, the central arm 36 of the bracket 3 can comprise three holes and the two lateral arms 35 of the bracket 3 comprise one hole. In this case, the holes are configured to receive a screw to be set on a girder frame.

For example, the two perpendicular arms 32 of the bracket 3 can each comprise one hole and the two perpendicular arms 22 of the insert 2 can each comprise one hole. In this case, these holes are configured to receive a fastener 43.

The first leaf spring bracket 1 can be manufactured by following steps:
A. The provision of a bracket 3, said bracket 3 being made of spheroidal graphite cast iron and
B. The manufacture of the insert 2 onto the bracket 3, said insert 2 being made of austempered ductile iron.

For example, in step B), the manufacture of the insert 2 onto the bracket 3 is performed by compound casting allowing a hybrid first leaf spring bracket wherein the insert 2 and the bracket 3 are strongly bonded by form closure and force closure.

Figure 4:
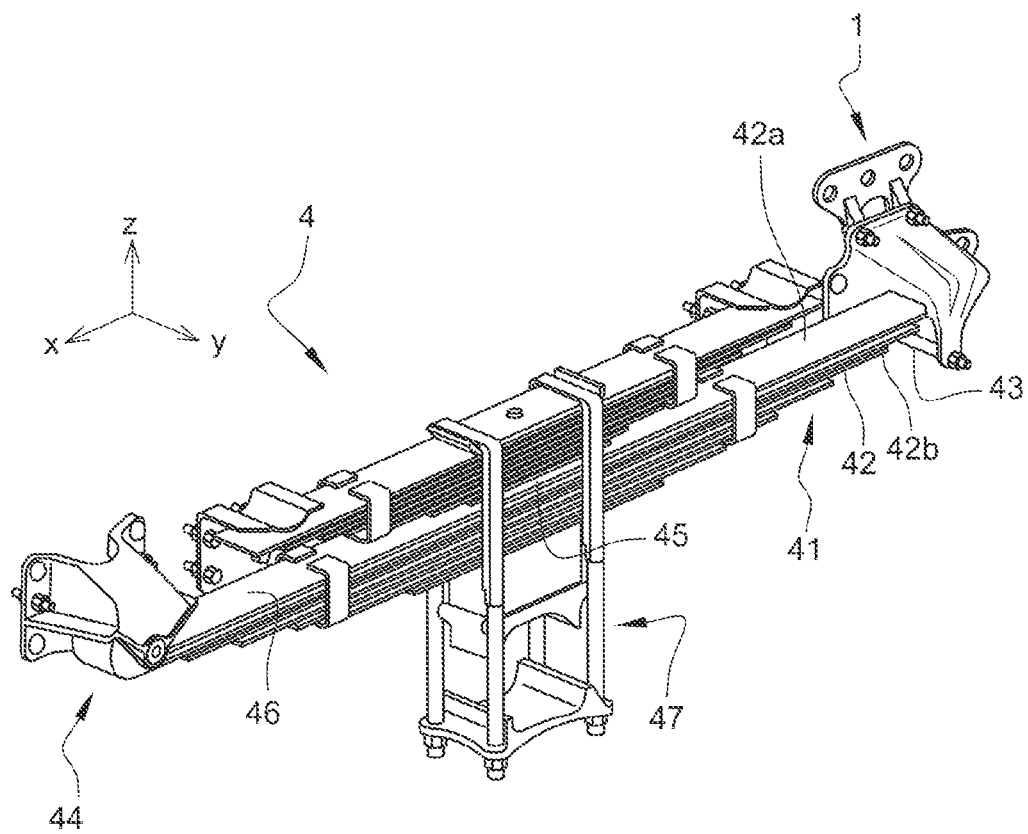

FIG. 4 illustrates an example of a suspension system 4 of a vehicle axle comprising a leaf spring 41, preferably loop-shaped, having a longitudinal axis X and a transverse axis Y. The leaf spring 41 can comprise a rear end portion 42. The leaf spring 41, which can typically be made of metal such as steel.

The first leaf spring bracket 1 is configured to be secured to a vehicle frame and receives the rear end portion 42 of a leaf spring 41 so as to allow said leaf spring rear end portion 42 to slide longitudinally relative to the first leaf spring bracket 1. The leaf spring 41 can comprise a rear end portion 42 substantially flat and has a top surface 42a in contact with the bracket 31 and insert pads 21 and a bottom surface 42b. The leaf spring 41 has a substantially horizontal top surface 42a and a substantially horizontal bottom surface 42b (when the vehicle is on a horizontal ground). The width of the leaf spring 41 can be substantially identical over the whole length.

The suspension system 4 can comprise a fastener 43 extending substantially transversally, the bracket 31 and insert pads 21 being located above the fastener 43.

The suspension system 4 further can comprise a second leaf spring bracket 44 configured to be secured to the vehicle frame and an intermediate attachment device 45. The leaf spring 41 comprises a front end portion 46, preferably loop-shaped, which is engaged in said second leaf spring bracket 44 and an intermediate portion 47 engaged in said intermediate attachment device 45 for attaching the vehicle axle to the vehicle frame.

The leaf spring rear end portion 41 can move longitudinally relative to the first leaf spring bracket 1, in the forward direction and preferably also in the rearward direction, with the fastener 43 and the leaf spring top surface 42a sliding against the bracket 31 and insert 21 pads.

A vehicle (not illustrated) can comprise a frame (not illustrated) including for example two girders (not illustrated), an axle (not illustrated) mounted on the frame and a suspension system 4.

The invention ensures a cost saving suspension system, in particular a leaf spring bracket, having a reduced weight while maintaining the mechanical properties.

It is to be understood that the present invention is not limited to the embodiments described above and illustrated in the drawings; rather, the skilled person will recognize that many changes and modifications may be made within the scope of the appended claims.

The invention claimed is:

1. A first leaf spring bracket having a longitudinal axis and a transverse axis, comprising:
    an insert comprising an insert pad extending transversally, the insert comprising a bottom surface and a top surface and being made of austempered ductile iron, and
    a bracket comprising a bracket pad extending transversally and two perpendicular arms which each contain at least one hole configured to receive a fastener, the bracket pad comprising a bottom surface and a top surface, the bottom surface of the bracket pad being configured to receive the top surface of the insert, the bracket being made of spheroidal graphite cast iron,
    wherein the leaf spring bracket is configured to receive a rear end portion of a leaf spring to allow the leaf spring rear end portion to slide longitudinally relative to the first leaf spring bracket; and
    the insert comprises two perpendicular arms which each contain at least one hole configured to receive the fastener.

2. The first leaf spring bracket of claim 1, wherein the insert pad has a concave or convex shape.

3. The first leaf spring bracket of claim 1, wherein the bracket pad has a concave or convex shape.

4. The first leaf spring bracket of claim 1, wherein the insert pad comprises a protrusion located on its top surface, the protrusion to be received by the bottom surface of the bracket.

5. The first leaf spring bracket of claim 1, wherein the bracket further comprises two lateral arms extending longitudinally.

6. The first leaf spring bracket of claim 5, wherein the bracket further comprises a central arm that overhangs the bracket pad and the insert pad.

7. The first leaf spring bracket of claim 6, wherein at least one element comprises at least one hole, the at least one element comprising at least one of the central arm of the bracket, the two perpendicular arms of the insert, the two perpendicular arms of the bracket, and the two lateral arms of the bracket.

8. A suspension system wherein the suspension system comprises:
    a leaf spring having a longitudinal axis and a transverse axis and comprising a rear end portion,
    a first leaf spring bracket having a longitudinal axis and a transverse axis, comprising:
        an insert comprising an insert pad extending transversally, the insert comprising a bottom surface and a top surface and being made of austempered ductile iron, and
        a bracket comprising a bracket pad extending transversally and two perpendicular arms which each contain at least one hole configured to receive a fastener, the bracket pad comprising a bottom surface and a top surface, the bottom surface of the bracket pad being configured to receive the top surface of the insert, the bracket being made of spheroidal graphite cast iron,
        wherein the first leaf spring bracket is configured receive a rear end portion of the leaf spring to allow the leaf spring rear end portion to slide longitudinally relative to the first leaf spring bracket; and
        the insert comprises two perpendicular arms which each contain at least one hole configured to receive the fastener, and
    the fastener extending substantially transversally, the bracket and the insert pad being located above the fastener.

9. The suspension system of claim 8, wherein the leaf spring comprises a rear end portion that is substantially flat and has a bottom surface and a top surface, wherein the top surface is in contact with the bracket and the insert pad.

10. The suspension system of claim 8, wherein the suspension system further comprises a second leaf spring bracket and an intermediate attachment device, the leaf spring comprising a front end portion, which is engaged in the second leaf spring bracket and an intermediate portion engaged in the intermediate attachment device.

11. A vehicle comprising an axle, comprising:
    a suspension system of the axle wherein the suspension system comprises:
        a leaf spring having a longitudinal axis and a transverse axis and comprising a rear end portion,
        a first leaf spring bracket having a longitudinal axis and a transverse axis, comprising:
            an insert comprising an insert pad extending transversally, the insert comprising a bottom surface and a top surface and being made of austempered ductile iron, and
            a bracket comprising a bracket pad extending transversally and two perpendicular arms which each contain at least one hole configured to receive a fastener, the bracket pad comprising a bottom surface and a top surface, the bottom surface of the bracket pad being configured to receive the top surface of the insert, the bracket being made of spheroidal graphite cast iron,
            wherein the first leaf spring bracket is configured to receive a rear end portion of the leaf spring to allow the leaf spring rear end portion to slide longitudinally relative to the first leaf spring bracket; and
            the insert comprises two perpendicular arms which each contain at least one hole configured to receive the fastener, and
        the fastener extending substantially transversally, the bracket and the insert pad being located above the fastener.

* * * * *